United States Patent [19]

Claar et al.

[11] Patent Number: 5,149,678

[45] Date of Patent: * Sep. 22, 1992

[54] METHOD OF MODIFYING CERAMIC COMPOSITE BODIES BY A POST-TREATMENT PROCESS AND ARTICLES PRODUCED THEREBY

[75] Inventors: Terry D. Claar; William B. Johnson, both of Newark, Del.; Robert A. Rapp, Columbus, Ohio

[73] Assignee: Lanxide Technology Company, LP, Newark, Del.

[*] Notice: The portion of the term of this patent subsequent to Apr. 2, 2008 has been disclaimed.

[21] Appl. No.: 551,487

[22] Filed: Jul. 12, 1990

Related U.S. Application Data

[63] Continuation-in-part of Ser. No. 296,966, Jan. 13, 1989, Pat. No. 5,004,714.

[51] Int. Cl.$^5$ ............................................. C04B 35/10
[52] U.S. Cl. ............................. 501/134; 419/12; 419/14; 419/16; 423/412; 423/625; 501/87; 501/96; 501/102; 75/235; 264/63; 264/60

[58] Field of Search .................. 501/134, 87, 96, 102; 419/12, 14, 16; 423/412, 625

[56] References Cited

U.S. PATENT DOCUMENTS

5,004,714 4/1991 Claar et al. ........................... 501/134

Primary Examiner—William R. Dixon, Jr.
Assistant Examiner—C. Melissa Bonner
Attorney, Agent, or Firm—Mark G. Mortenson; Carol A. Lewis; Stanislav Antolin

[57] ABSTRACT

The present invention relates to a novel method of manufacturing a composite body, such as a $ZrB_2$-$ZrC$-$Zr$ composite body, by utilizing a post-treatment technique which may improve the oxidation resistance of the composite body. Moreover, the invention relates to novel products made according to the process. The novel process modifies at least a portion of a composite body by exposing said body to a source of second metal.

20 Claims, 3 Drawing Sheets

METHOD OF MODIFYING CERAMIC COMPOSITE BODIES BY A POST-TREATMENT PROCESS AND ARTICLES PRODUCED THEREBY

CROSS REFERENCE TO RELATED APPLICATION

This application is a continuation-in-part of application Ser. No. 296,966, filed Jan. 13, 1989, now U.S. Pat. No. 5,004,714, in the name of Terry Dennis Claar et al. and entitled "A Method of Modifying Ceramic Composite Bodies By a Post-Treatment Process and Articles Produced Thereby". The contents of the above-identified patent application are hereby expressly incorporated by reference.

FIELD OF THE INVENTION

This invention relates generally to a novel method of manufacturing a composite body, such as a $ZrB_2$—$ZrC$—$Zr$ composite body, including the use of a post-treatment technique, and to novel products made thereby. More particularly, the invention relates to a method of modifying a composite body comprising one or more boron-containing compounds (e.g., a boride or a boride and a carbide) which has been made by the reactive infiltration of a molten parent metal into a bed or mass comprising boron carbide, and optionally one or more inert fillers, to form the body.

BACKGROUND OF THE INVENTION

In recent years, there has been an increasing interest in the use of ceramics for structural applications historically served by metals. The impetus for this interest has been the relative superiority of ceramics, when compared to metals, with respect to certain properties, such as corrosion resistance, hardness, wear resistance, modulus of elasticity and refractory capabilities.

However, a major limitation on the use of ceramics for such purposes is the feasibility and cost of producing the desired ceramic structures. For example, the production of ceramic boride bodies by the methods of hot pressing, reaction sintering, and reaction hot pressing is well known. While there has been some limited success in producing ceramic boride bodies according to the above-discussed methods, there is still a need for a more effective and economical method to prepare dense boride-containing materials.

In addition, a second major limitation on the use of ceramics for structural applications is that ceramics generally exhibit a lack of toughness (i.e., damage tolerance, or resistance to fracture). Such lack of toughness tends to result in sudden, easily induced, catastrophic failure of ceramics in applications involving rather moderate tensile stresses. This lack of toughness tends to be particularly common in monolithic ceramic boride bodies.

One approach to overcome the above-discussed problem has been the attempt to use ceramics in combination with metals, for example, as cermets or metal matrix composites. The objective of this known approach is to obtain a combination of the best properties of the ceramic (e.g., hardness and/or stiffness) and the best properties of the metal (e.g., ductility). while there has been some general success in the cermet area in the production of boride compounds, there still remains a need for more effective and economical methods to prepare boride-containing materials.

DISCUSSION OF RELATED PATENT APPLICATIONS

Many of the above-discussed problems associated with the production of boride-containing materials have been addressed in U.S. Pat. No. 4,885,130 (hereinafter "Patent '130"), which issued on Dec. 5, 1989, in the names of Danny R. White, Michael K. Aghajanian and T. Dennis Claar, and is entitled "Process for Preparing Self-Supporting Bodies and Products Made Thereby".

Briefly summarizing the disclosure of Patent '130, self-supporting ceramic bodies are produced by utilizing a parent metal infiltration and reaction process (i.e., reactive infiltration) in the presence of a mass comprising boron carbide. Particularly, a bed or mass comprising boron carbide and, optionally, one or more of a boron donor material and a carbon donor material, is infiltrated by molten parent metal, and the bed may be comprised entirely of boron carbide or only partially of boron carbide, thus resulting in a self-supporting body comprising, at least in part, one or more parent metal boron-containing compounds, which compounds include a parent metal boride or a parent metal boro carbide, or both, and typically also may include a parent metal carbide. It is also disclosed that the mass comprising boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of Patent '130, a mass comprising boron carbide and, optionally, one or more of a boron donor material and a carbon donor material, is placed adjacent to or in contact with a body of molten metal or metal alloy, which is melted in a substantially inert environment within a particular temperature envelope. The molten metal infiltrates the mass comprising boron carbide and reacts with at least the boron carbide to form at least one reaction product. The boron carbide (and/or the boron donor material and/or the carbon donor material) is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted mass comprising boron carbide by a wicking or a capillary action. This transported metal forms additional parent metal boride, carbide, and/or boro carbide and the formation or development of a ceramic body is continued until either the parent metal or mass comprising boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in Patent '130, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the mass comprising boron carbide, the relative amounts of boron carbide and parent metal, alloys of the parent metal, dilution of the boron carbide with a filler, the amount of boron donor material and/or carbon donor material mixed with the mass comprising boron carbide, temperature, and time. Preferably, conversion of the boron carbide to the parent metal boride, parent metal boro compound(s) and parent metal carbide is at least about 50%, and most preferably at least about 90%.

The typical environment or atmosphere which was utilized in Patent '130 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Still further, it is disclosed that by adding a carbon donor material (e.g., graphite powder or carbon black) and/or a boron donor material (e.g., a boron powder, silicon borides, nickel borides and iron borides) to the mass comprising boron carbide, the ratio of parent metal-boride/parent metal-carbide can be adjusted. For example, if zirconium is used as the parent metal, the ratio of $ZrB_2/ZrC$ can be reduced if a carbon donor material is utilized (i.e., more ZrC is produced due to the addition of a carbon donor material in the mass of boron carbide) while if a boron donor material is utilized, the ratio of $ZrB_2/ZrC$ can be increased (i.e., more $ZrB_2$ is produced due to the addition of a boron donor material in the mass of boron carbide). Still further, the relative size of $ZrB_2$ platelets which are formed in the body may be larger than platelets that are formed by a similar process without the use of a boron donor material. Thus, the addition of a carbon donor material and/or a boron donor material may also affect the morphology of the resultant material.

In another related Patent, specifically, U.S. Pat. No. 4,915,736 (hereinafter referred to as "Patent '736"), issued in the names of Terry Dennis Claar and Gerhard Hans Schiroky, on Apr. 10, 1990, and entitled "A Method of Modifying Ceramic Composite Bodies By a Carburization Process and Articles Made Thereby", additional modification techniques are disclosed. Specifically, Patent '736 discloses that a ceramic composite body made in accordance with the teachings of, for example, Patent '130 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, Patent '736 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5-30 volume percent, such composite body could be modified by a post-carburization treatment to result in from about 0 to about 2 volume percent, typically about ½ to about 2 volume percent, of parent metal remaining in the composite body.

U.S. Pat. No. 4,885,131 (hereafter "Patent '131"), issued in the name of Marc S. Newkirk on Dec. 5, 1989, and entitled "Process For Preparing Self-Supporting Bodies and Products Produced Thereby", discloses additional reactive infiltration formation techniques. Specifically, Patent '131 discloses the self-supporting bodies can be produced by a reactive infiltration of a parent metal into a mixture of a bed or mass comprising a boron donor material and a carbon donor material. The relative amounts of reactants and process conditions may be altered or controlled to yield a body containing varying volume percents of ceramic, metals, ratios of one ceramic or another and porosity.

In another related patent application, specifically, copending U.S. patent application Ser. No. 07/296,770 (hereinafter referred to as "Application '770"), filed in the names of Terry Dennis Claar et al., on Jan. 13, 1989, and entitled "A Method of Producing Ceramic Composite Bodies", additional reactive infiltration formation techniques are disclosed. Specifically, Application '770 discloses various techniques for shaping a bed or mass comprising boron carbide into a predetermined shape and thereafter reactively infiltrating the bed or mass comprising boron carbide to form a self-supporting body of a desired size and shape.

Copending U.S. patent application Ser. No. 07/296,837 (hereinafter referred to as "Application '837"), filed in the name of Terry Dennis Claar on Jan. 13, 1989, and entitled "A Method of Bonding A Ceramic Composite Body to a Second Body and Articles Produced Thereby", discloses various bonding techniques for bonding self-supporting bodies to second materials. Particularly, this patent application discloses that a bed or mass comprising one or more boron-containing compounds is reactively infiltrated by a molten parent metal to produce a self-supporting body. Moreover, residual or excess metal is permitted to remain bonded to the formed self-supporting body. The excess metal is utilized to form a bond between the formed self-supporting body and another body (e.g., a metal body or a ceramic body of any particular size or shape).

The reactive infiltration of a parent metal into a bed or mass comprising boron nitride is disclosed in copending U.S. Pat. No. 4,904,446 (hereinafter "Patent '446"), issued in the names of Danny Ray White et al., on Feb. 27, 1990, and entitled "Process for Preparing Self-Supporting Bodies and Products Made Thereby". Specifically, this patent discloses that a bed or mass comprising boron nitride can be reactively infiltrated by a parent metal. A relative amount of reactants and process conditions may be altered or controlled to yield a body containing varying volume percents of ceramic, metal and/or porosity. Additionally, the self-supporting body which results comprises a boron-containing compound, a nitrogen-containing compound and, optionally, a metal. Additionally, inert fillers may be included in the formed self-supporting body.

Copending U.S. patent application Ser. No. 07/286,961, now U.S. Pat. No. 5,019,539, (hereinafter "Patent '539"), filed in the names of Terry Dennis Claar et al., on Jan. 13, 1989, and entitled "A Process for Preparing Self-Supporting Bodies Having Controlled Porosity and Graded Properties and Products Produced Thereby", discloses reacting a mixture of powered parent metal with a bed or mass comprising boron carbide and, optionally, one or more inert fillers. Additionally, it is disclosed that both a powdered parent metal and a body or pool of molten parent metal can be induced to react with a bed or mass comprising boron carbide. The body which is produced is a body which has controlled or graded properties.

The disclosures of each of the above-discussed Commonly Owned U.S. Patent Applications and Patents are herein expressly incorporated by reference.

SUMMARY OF THE INVENTION

The present invention has been developed in view of the foregoing and to overcome the deficiencies of the prior art.

The invention provides a method for modifying the resultant properties of a formed composite body. More particularly, a formed composite body, as discussed later herein, can be modified by contacting the formed body with a second material which contains at least one metal which is reactive with at least one of the metal residual metal and/or ceramic phases in the formed body (e.g., the second material may be comprised primarily of the reactive metal (e.g., a reactive powdered metal) or only a portion of the second material may comprise a reactive metal (e.g., a compound which contains at least one reactive component)). Thus, the formed body may be contacted with a bed or powdered material containing a second metal. Upon such contact, residual parent metal in the formed composite body and/or at least one of the phases in the formed body, may react with the second metal contained in the second material (i.e. the bed or powdered material) thereby modifying the properties of the composite body. For example, aluminum (e.g., aluminizing) or silicon (e.g., siliconizing) metal could function as the second metal. and they could be provided in the form of a powder. Such powder, when placed into contact with the formed ceramic composite body in the presence of, for example, an inert atmosphere, would result in a reaction of the second metal with the formed ceramic composite body (e.g., a reaction between the aluminum or silicon metal with at least one of the ceramic phases in the formed body and/or a reaction with residual parent metal in the formed body).

The amount of conversion or reaction could be controlled to any desired extent. For example, the reaction could be confined to a surface area or could extend beyond the surface of a ceramic composite body. Particularly, the extent of conversion or reaction may be manipulated by varying the length of time and/or temperature of exposure to the second material.

Moreover, the source of second metal may be any source or donor material which provides, under the process temperatures and process conditions, at least some second metal for reaction with at least one component in the formed body.

Each of the treatments discussed above herein typically is effected after a composite body is formed by the process disclosed in the copending Applications discussed above herein.

Stated more specifically, after a composite body is produced according to, for example, Patent '130, the composite may, for example, be embedded in a powdered material (e.g., alumina, a mixture of alumina and silicon or a mixture of alumina and silica, etc.). The powder should, preferably, physically contact at least one surface of the formed composite body and both the formed composite body and powdered material are contained in, for example, a graphite or an alumina crucible. The entire assembly is heated in an inert or substantially non-reactive atmosphere (e.g., argon) up to a temperature which permits reaction of the powdered material (i.e., the second metal) and the formed composite body. The reaction can be localized to a surface of the composite body, or may extend into the composite body any predetermined amount.

Such post-treatment techniques are advantageous because a composite body modified by such treatments may be more resistant to oxidation (i.e., at least that portion thereof which has been modified by the aforementioned post-treatment processes may be more resistant to oxidation relative to an untreated portion of the body).

This application refers primarily to $ZrB_2$—$ZrC$—$Zr$ composite bodies, hereinafter sometimes referred to as "ZBC" composite bodies. However, it should be understood that while specific emphasis has been placed upon ZBC composite bodies, similar manufacturing steps are applicable to, for example, titanium, hafnium, etc., parent metal composite bodies as well.

DETAILED DESCRIPTION OF THE PREFERRED EMBODIMENTS

Figure 1:
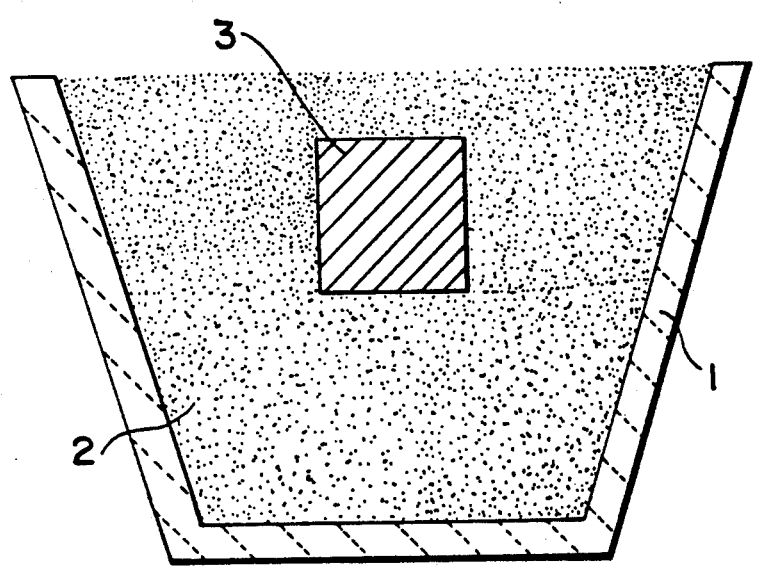
FIG. 1 is a schematic elevational view in cross-section showing a ZBC composite body 3 embedded in a siliconizing or aluminizing powder bedding 2 and contained within a refractory vessel 1, to be processed according to the present invention.

The present invention is based on the discovery that the properties of a ceramic composite body, particularly a ceramic composite body which is manufactured by the reactive infiltration of a parent metal of zirconium, hafnium, titanium, etc., into, for example, a mass comprising boron carbide can be modified by a post-manufacturing treatment. Such a post-manufacturing treatment can alter the microstructure, and thus the resultant properties (e.g., physical, mechanical and thermal properties), of a portion or substantially all of a ZBC composite body.

A ZBC composite body, produced according to any of the patent applications discussed above herein, for example, Patent '130, can be modified by exposing the composite to a second material which contains at least one second metal which is reactive with at least one of the residual metal and/or ceramic phases in the formed body. Such reaction, in some circumstances, may be characterized as a diffusion reaction. For example, a reaction could be induced by embedding a ZBC composite body in a bedding comprising a second material and reaction at least a portion of the bedding, in some manner, with at least a portion of the formed ZBC body.

In a preferred embodiment, a formed composite body, for example, a ZBC body produced according to Patent '130, can undergo a surface modification by contacting the formed body with a material which contains at least one second metal which is reactive with at least one of the residual metal and/or ceramic phase(s) in the formed body. More particularly, the formed body may be at least partially buried in a bed of powdered material containing a second metal. For example, silicon metal could be provided in the form of a powder and the powder may be placed into contact with at least a portion of the formed ceramic composite body in the presence of, for example, an inert atmosphere. When such an arrangement was subjected to an elevated reaction temperature, a reaction between the powdered metal and the formed ceramic composite body would occur. Thus, when a ZBC body is contacted with a silicon bedding in the presence of a substantially inert atmospheric at about 1300° C., surface coatings comprising $ZrSi_2$ $ZrSiO_4$ and optionally $ZrO_2$ will begin to form on the composite body. In some instances, the surface coating may include portions of the original ZBC body (e.g., ZrC, $ZrB_2$ and Zr). While not wishing to be bound by any particular theory or explanation, it is believed that the silicon may diffuse into the ZBC body and react with either or both of the ZrC and Zr phases. Suitable sources of a silicon second material include, but are not limited to, materials comprising silicon, silicon carbide, silicon dioxide, silicon bromide, molybdenum silicide, zirconium orthosilicate and mixtures thereof.

Similar to the formation of a siliconized coating, the formed body (e.g., a ZBC body) may also be aluminized by placing a formed body into a bed comprising $Al_2O_3$, $Al_2O_3$—Si, and/or other Al containing beddings. In some aspects of the present invention, it may be desirable to sequentially or simultaneously induce a reaction between two second materials and a ZBC composite body. Particularly, a ZBC composite may be exposed to a bedding comprising at least two second materials. For example, a ZBC composite body may be at least partially embedded within a mixture comprising particulate silicon and alumina which may permit substantially simultaneous aluminizing and siliconizing in at least a portion of the ZBC composite body.

Although each of the conversions discussed above may extend beyond the immediate surface area of a ZBC body, it has been discovered that when such a surface coating is formed, the coating made according to the present invention exhibits an improved adherence to the formed body relative to externally applied coatings (e.g., by plasma spraying, CVD, PVD, etc.).

Such post-treatment techniques are advantageous because any portion of a composite body which has been modified by such treatments, will be more resistant to oxidation, relative to a portion which has not been modified by the aforementioned post-treatment processes. Particularly, it has been discovered that a ZBC body which has been siliconized, as discussed above (e.g., wherein at least a portion of the body has been converted to $ZrSiO_4$), has improved oxidation resistance in moist air at high temperatures (e.g., 1100° C.-1400° C.). Particularly, a ZBC composite body having a modified layer or region of at least about 80 microns thick has been found to be desirable. However, a modified layer or region of any thickness is acceptable which enhances at least one property of the post-treated composite body.

It is possible to modify further the ZBC body by including another material with the second material, for example, the silicon and/or alumina. Specifically, in the case of a silicon bedding, in some situations it may be desirable to include at least some germanium with the silicon bedding. The germanium may modify the converted portion of the ZBC even further, thereby imparting even more desirable properties to the converted region.

Moreover, by controlling the time of exposure of the ZBC composite body to the second material, for example, silicon or aluminum, and/or the time and temperature at which reaction or modification occurs, the modified zone or layer that is formed on at least the exterior surface of a formed body can be controlled in virtually an unlimited fashion (i.e., composition, morphology and/or thickness can all be controlled in a desirable manner). Thus, the above-discussed post-treatment process can result in a hard, wear-resistant surface surrounding a core of ZBC composite material having a higher metal content and higher fracture toughness.

The following are examples of the present invention. The examples are intended to be illustrative of various aspects of a post-treatment of a composite body, particularly a ZBC composite body. However, these examples should not be construed as limiting the scope of the invention.

EXAMPLE 1

In this example a ZBC body was formed substantially according to the procedures set forth in Example 1 of Patent '130. The ZBC body was substantially cylindrical having a diameter measuring about 7.8 millimeters and a length of approximately 12.5 millimeters and weighing about 3.7 grams. The ZBC cylinder was embedded (i.e., substantially completely surrounded) in a bedding comprising $ZrSiO_4$ mixed with about 25 weight percent silicon metal. The $ZrSiO_4$ was sold under the trade name of EXCELOPAX and the silicon metal was sold under the trade name of AEE-325, The ZBC body surrounded by the mixture of ZrSiO$_4$ and silicon metal was contained in a high purity Al$_2$O$_3$ boat.

The alumina boat was placed into an electric resistance heating furnace. The furnace was twice evacuated and backfilled with argon. During the subsequent heating steps, dry argon was passed through the furnace at a rate of about 500 cc/minute. The furnace was brought up to a temperature of about 1300° C. at a rate of about 200° C. per hour. This temperature was maintained for about six hours. The furnace was allowed to cool to room temperature at a rate of about 200° C. per hour. The alumina boat was removed from the furnace and the ZBC cylinder was inspected. It was discovered that the ZBC cylinder had been modified by this treatment. Specifically, the ZBC cylinder contained a silicon-containing coating on a surface thereof.

Figure 2:
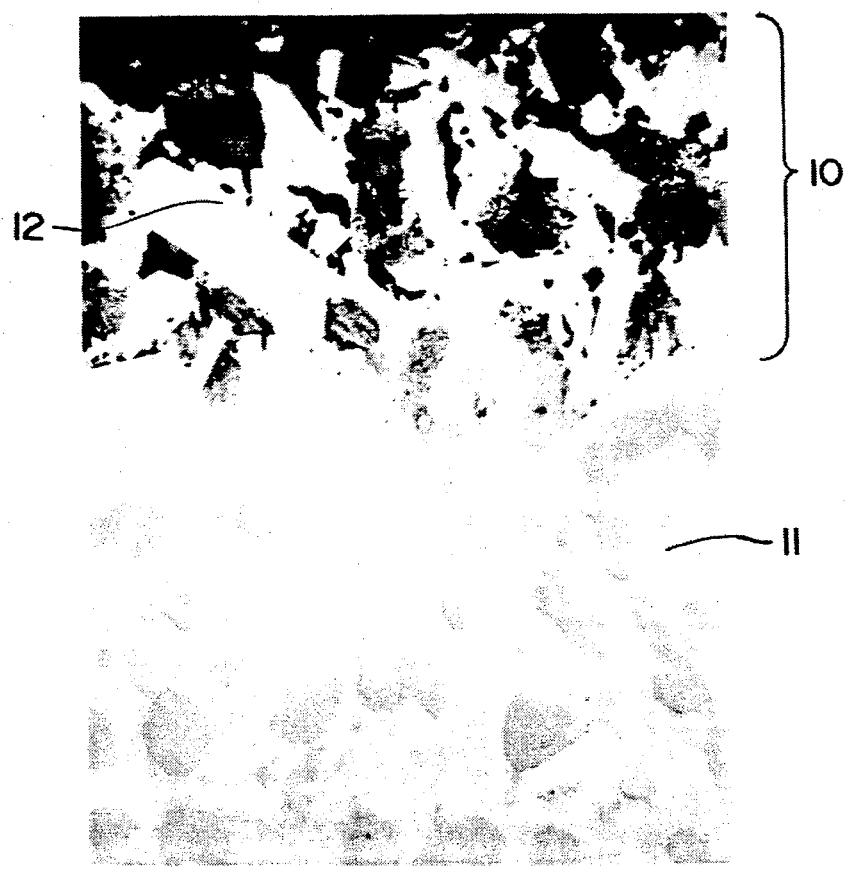
FIG. 2 is a photomicrograph at 400X of a section of a composite formed according to Example 1.

FIG. 2 is a photomicrograph at 400X of a section of the ZBC body having a modified layer formed in accordance with Example 1. The region 10 of FIG. 1 represents the modified or siliconized surface. The ZrB$_2$ platelets 12 in the modified layer appear to be substantially unaffected by the modification or siliconizing treatment as can be determined upon comparison to the ZrB$_2$ platelets 11 in the unmodified region. The modified layer comprises the phases of ZrSi$_2$ and ZrSiO$_4$ as well as minor portions of ZrO$_2$.

EXAMPLE 2

This example was conducted substantially in accordance with Example 2 with the exception that a bedding comprising SiO$_2$ and silicon metal was utilized. Specifically, a ZBC bar formed substantially according to the procedures set forth in Example 1 in Patent '130 was first formed. The bar measured about 1.7 centimeters in length by about 0.6 centimeters in width and about 0.3 centimeters in thickness. The ZBC bar weighed about 1.62 grams. The bar was placed into a bedding comprising about 24 grams of No. 500 SiO$_2$ and about 8 grams of −300 mesh silicon metal, the bedding being contained in a high purity alumina boat. The ZBC bar was substantially surrounded by the bedding material.

The alumina boat containing the ZBC bar and the bedding was placed into a furnace which was twice evacuated and backfilled with argon. The furnace was heated in accordance with Example 1. The furnace was allowed to cool and the alumina boat removed. It was discovered that a surface of the ZBC bar had been modified. Specifically, the surface comprised an oxidation resistant silicon-containing coating.

EXAMPLE 3

The post-treatment procedures of this example were similar to the procedures set forth in Example 1, with the exception that the bedding material comprised Al$_2$O$_3$ and silicon metal. Specifically, a ZBC bar formed substantially in accordance with the procedure set forth in Example 1 and Patent '130 was utilized. The bar measured about 2.1 centimeters in length and about 0.6 centimeters in width and about 0.3 centimeters in thickness. The ZBC bar weighed about 2.1 grams. The ZBC bar was substantially surrounded by a bedding by a high purity alumina boat. The bedding comprised about 30 grams of (A17) Al$_2$O$_3$ and about 10 grams of silicon metal. The alumina boat containing the bedding and the ZBC bar was placed into a electric resistance heating furnace and twice evacuated and backfilled with argon. The furnace was heated in accordance with Example 1.

The alumina boat was removed from the furnace and inspected. It was discovered that a surface of the ZBC had been modified. Specifically, the surface comprised on oxidation resistant silicon and alumina-containing coating.

EXAMPLE 4

The post-treatment procedures of this example were similar to the procedures set forth in Example 1, with the exception that a bedding comprising SiC and silicon metal was utilized. Specifically, a ZBC bar formed substantially in accordance with the procedures set forth in Example 1 in Patent '130 was utilized. The ZBC bar measured about 3 centimeters in length by about 0.6 centimeters in width and about 3 centimeters in thickness. The bar weighed about 3 grams. The ZBC bar was placed into a high purity alumina crucible containing a bedding which substantially surrounded the ZBC bar. The bedding comprised about 24 grams of SiC, sold by Exolon-ESK Company (Tonawanda, N.Y.), with about 8 grams of silicon metal. The alumina crucible containing the ZBC bar and the bedding was placed into an electric resistance heating furnace. The furnace was twice evacuated and backfilled with argon. The furnace was heated in accordance with Example 1.

The alumina crucible was removed and inspected. It was discovered that a surface of the ZBC bar had been modified. Specifically, the surface comprised an oxidation resistant silicon-containing coating.

EXAMPLE 5

The post-treatment procedures of this example were similar to the procedures set forth in Example 1, with the exception that a bedding comprising silicon metal was utilized. A ZBC bar formed substantially in accordance with procedures set forth in Example 1 of Patent '130 was utilized. Specifically, the ZBC bar measured about 3 centimeters in length and about 0.6 centimeters in width and about 0.3 centimeters in thickness. The ZBC bar weighed about 3.2 grams. The ZBC bar was placed into a bedding which substantially surrounded the ZBC bar, both of which were contained within a high purity alumina boat. The bedding comprised about 32 grams of silicon metal. The alumina boat containing the bedding and the ZBC bar was placed into an electric resistance heating furnace. The furnace was twice evacuated and backfilled with argon. The furnace was heated substantially in accordance with Example 1. The furnace was allowed to cool and the alumina boat was removed and inspected. It was discovered that a surface of the ZBC bar had been modified. Specifically, the surface comprised an oxidation resistant silicon-containing coating.

EXAMPLE 6

A ZBC body was formed substantially according to the procedures set forth in Example 1 of Patent '130. The ZBC body was a square bar which measured approximately 1.58 cm long by 0.60 cm wide and 0.48 cm thick and weighing approximately 2.3 grams. The ZBC bar was substantially surrounded in a bedding comprising ZrSiO$_4$ (TAM Excelopax) mixed mechanically with about 25 wt % Si metal Atlantic Equipment Engineers (−(−325 mesh and contained within a high purity Al$_2$O$_3$ boat.

The alumina boat and its contents were placed inside a vacuum/inert atmosphere furnace which was twice evacuated and backfilled with argon gas. After the second backfilling, dry argon gas was left flowing at about 500 cc/minute. The temperature was increased from room temperature to about 1400° C. at a rate of 200° per hour. The furnace temperature remained at about 1400° C. for about 6 hours. The furnace was cooled at a rate of about 200° C. per hour back to room temperature.

Figure 3:
FIG. 3 is a photomicrograph at 1000X of a section of a siliconized composite formed according to Example 6.

After removal from the furnace, the sample was analyzed and was found to have been siliconized (e.g., the body reacted with the bedding). Specifically, silicon had penetrated (e.g., diffused) about 300 microns into the sample. The Zr metal phase reacted with the Si to form a phase comprising $ZrSi_2$. Further, the sample was found to have about 14 wt % silicon on its surface. A phase analysis of the sample indicated that the microstructure comprised the following phases: $ZrB_2$, $ZrC$, $ZrSi_2$ and $ZrO_2$. FIG. 3 is a photomicrograph taken at 1000X of a cross-section of a siliconized ZBC composite.

The improvement in the oxidation resistance resulting from siliconizing the ZBC body was tested by comparing the siliconized ZBC bodies formed according to this Example to an untreated or non-siliconized ZBC body. Specifically, the non-siliconized ZBC body was heated in a wet air (2-3% water) atmosphere to a temperature of about 1100° C. and held there for about 20 hours. The untreated ZBC sample had a weight gain of about 40 mg/cm$^2$. Further, the structural integrity had deteriorated into a weak powdery product.

In comparison, ZBC Samples A-D, which were siliconized in accordance with this Example, were exposed to wet air (2-3% water) and the test conditions listed in the following Table.

TABLE

| Siliconized ZBC Sample | Test Conditions | Weight Gain |
| --- | --- | --- |
| A | 100 hours at 1100 C. | 1.8 mg/cm |
| B | 100 hours at 1200 C. | 11.6 mg/cm |
| C | 100 hours at 1300 C. | 30.4 mg/cm |
| D | 100 hours at 1400 C. | 65.8 mg/cm |

All of the samples listed in the above Table retained adequate structural integrity after exposure to the oxidizing environment. Particularly, this Example demonstrates that a ZBC body may be post-treated or siliconized which permits length exposure to a moist high temperature oxidizing environment without undue weight gain or undue loss in structural integrity.

What is claimed is:

1. A method of producing a self-supporting body comprising producing a first composite body by:
    selecting a parent metal;
    heating said parent metal in a substantially inert atmosphere to a temperature sufficient to permit infiltration of molten parent metal into a mass comprising at least one boron donor material and at least one carbon donor material and reacting molten parent metal with said mass to form at least one parent metal boron-containing compound;
    continuing said infiltration reaction for a time sufficient to produce said first composite body comprising at least one parent metal boron-containing compound; and
    contacting at least a portion of said first composite body with a source of a second metal for a predetermined time at a predetermined temperature, thereby reacting a least a portion of said first composite body with said source of a second metal to form said self-supporting body.

2. A method according to claim 1, wherein said source of a second metal comprises at least one material selected from the group consisting of an aluminum-containing material and a silicon-containing material.

3. A method according to claim 1 or 2, wherein said first composite body comprises $ZrB_2$, ZrC and Zr.

4. A method according to claim 1, further comprising modifying said at least a portion of said first composite body by including a source of at least one third metal with said source of a second metal.

5. A method according to claim 1 or 2, wherein said first composite body comprises $TiB_2$, TiC, and Ti.

6. A method according to claim 1 or 2, wherein said first composite body comprises $HfB_2$, HfC, and Hf.

7. The method according to claim 2, wherein said source of a second metal comprises at least one silicon-containing material selected from the group consisting of silicon, silicon carbide, silicon dioxide, silicon boride, molybdenum silicide and zirconium orthosilicate.

8. A product produced in accordance with claim 1.

9. The method of claim 1, wherein said reacting at least a portion of said first composite body with said source of a second metal is carried out at only a surface of said first composite body.

10. The method of claim 1, wherein said reacting at least a portion of said first composite body with said source of a second metal is carried out substantially completely throughout said first composite body.

11. The method of claim 1, wherein said parent metal comprises at least one metal selected from the group consisting of zirconium, aluminum, silicon, titanium, hafnium, lanthanum, iron, calcium, vanadium, niobium, magnesium and beryllium.

12. The method according to claim 2, wherein said source of a second metal comprises at least one aluminum-containing material selected from the group consisting of aluminum and alumina.

13. The method according to claim 1, wherein said first composite body further comprises a filler material in at least a portion thereof.

14. The method of claim 4, wherein said source of a second metal comprises a silicon-containing material and said source of a third metal comprises a germanium-containing material.

15. The method of claim 1, wherein said source of a second metal comprises at least one of a solid, a liquid and a vapor.

16. A product produced in accordance with claim 3.

17. A product produced in accordance with claim 5.

18. A product produced in accordance with claim 6.

19. The method of claim 1, wherein said at least one boron donor material and at least one carbon donor material comprise boron carbide and said source of a second metal comprises at least one material selected from the group consisting of silicon, silicon carbide, silicon dioxide, silicon boride, molybdenum silicide, zirconium orthosilicate, aluminum and alumina.

20. The method of claim 11, wherein said parent metal comprises at least one metal selected from the group consisting of zirconium, titanium and hafnium.

* * * * *